United States Patent [19]

White

[11] Patent Number: 4,891,718
[45] Date of Patent: * Jan. 2, 1990

[54] MAGNETIC RECORDING

[76] Inventor: R. Kent White, 420 Kiskonko Turn, Ft. Washington, Md. 20744

[*] Notice: The portion of the term of this patent subsequent to Nov. 25, 2003 has been disclaimed.

[21] Appl. No.: 244,589

[22] Filed: Sep. 13, 1988

Related U.S. Application Data

[63] Continuation of Ser. No. 898,217, Aug. 20, 1986, abandoned, which is a continuation of Ser. No. 669,357, Nov. 8, 1984, which is a continuation-in-part of Ser. No. 560,103, Dec. 12, 1983, abandoned.

[51] Int. Cl.$^4$ .............................................. G11B 5/09
[52] U.S. Cl. ........................................ 360/46; 360/68
[58] Field of Search ..................................... 360/46, 68

[56] References Cited

U.S. PATENT DOCUMENTS 4,600,954  7/1986  Bauer .................................... 360/67

OTHER PUBLICATIONS

"Magnetic Tape Instrumentation", G. Davies, McGraw Hill Book Co. @1961, pp. 8, 9.

Primary Examiner—Vincent P. Canney
Attorney, Agent, or Firm—Boris Haskell

[57] ABSTRACT

Magnetic recording of a data continuum is effected by means of sequential impulses of recording current. The impulses occur at regular intervals providing samples of the data continuum. The impulses are of very short time duration, in that each impulse extends for only a small fraction of the time interval that is required for a point on the record medium to traverse the effective recording field of the record head. The time spacing between impulses is approximately equal to said time interval, thereby providing a magnetic recording continuum corresponding to said data continuum.

17 Claims, 9 Drawing Sheets

FIG. 5A
DEMAGNETIZATION FACTOR ≈ 0

FIG. 5B
DEMAGNETIZATION FACTOR ≈ 1

MAGNETIC RECORDING

BACKGROUND AND SUMMARY OF THE INVENTION

This is a continuation of Ser. No. 898,217 (filed 8/20/86), now abandoned which is a continuation of application Ser. No. 669,357, filed Nov. 8, 1984, now U.S. Pat No. 4,625,245 which is a continuation-in-part of application Ser. No. 560,103 filed Dec. 12, 1983, now abandoned.

The present invention relates to magnetic recording, wherein a magnetization continuum is recorded on a magnetic recording medium by means of a transducer (record head) driven by electrical signal currents having an active duty cycle which is lower than that of the recorded magnetizations or of the analogous electrical signals reproducable from them. The invention provides continuous recording with only intermittent power consumption and low heat dissipation, an advantage which favors selection of low cost circuits as record head drivers. Other advantages of the invention will be apparent from the further description herein.

The present invention is generally applicable to various forms of magnetic recording, but is described herein for purpose of illustration in its application to digital recording on a variety of media, e.g., magnetic disks, tapes, drums and cards. Although the invention is described, at times herein, in terms most applicable to fixed, ring head, longitudinal recording on magnetic tape, it is understood that it is not limited thereto.

In accordance with the present invention, a magnetic record medium, such as a tape, is continuously driven across, or traverses, the record gap of a magnetic record head to record a continuum of data or intelligence thereon. In conventional magnetic recording, the intelligence is embodied in a continuum of electrical signals that are transduced continuously by the record head to effect a continuous magnetic recording action on the record tape. Pursuant to the present invention, the continuum of electrical signals are sampled and applied to the record head as discrete and discontinuous impulses of very short duration. The time duration of each impulse is a fraction of the time interval required for a point on the record medium to traverse the effective record gap of the record head or transducer. Also, the time spacing between successive record impulses is approximately equal to the aforesaid time interval of traverse.

The present invention takes advantage of the fact that upon the application to the record head of a record current impulse, the value of that impulse is immediately recorded over the entire extent of record medium spanning the effective recording gap or effetive recording field of the record head. Each succeeding record impulse is applied to the head preferably at the instant that each preceding recorded increment has completed its traverse across the effective recording field. Thus, although the electrical record impulses are applied discontinuously, the magnetic recording is in fact substantially a continuum and will be transduced by a play back head into an electrical continuum corresponding to the original electrical signal continuum from which the record impulses are sampled.

In order to appreciate fully the significance and advantages of the present invention, a summary description and analysis is provided of magnetic recording principles and their application in accordance with the standard practices of the prior art.

MAGNETIC RECORDING PRINCIPLES AND PRIOR ART PRACTICES

The ensuing summary description of the principles of magnetic recording and their application in prior art magnetic recording practices is had in conjunction with the accompanying FIGS. 1–11, which are described in sequence in the following description.

Digital record and reproduce systems, well known and broadly applied in the art, provide an output electrical signal conveying binary intelligence by means of two signal levels, e.g., positive and negative, or by means of a transition sequence between levels. Numerous digital encoding methods are practiced and their selection depends upon factors such as application, need to conform to data interchange standards, bit pattern sensitivity or frequency spectrum restrictions of a digital system and the preference of the system designer.

In digital magnetic recording systems which do not have intra-system code conversion, the reproduced electrical signal continuum is analogous to a magnetic flux continuum recorded on a medium. The output electrical signal level corresponds to the sense, i.e. direction, of a recorded magnetization, and a transition in output electrical signal level corresponds to a transition from one magnetization sense to another. The recording transducer (record head) signal current continuum producing the recording relates to the magnetic flux continuum in the same manner.

It is common practice to use record current levels sufficient to produce near saturation remanence in the medium; higher current levels are used if there is a need to reliably record new data over prerecorded data (overwrite) without benefit of an erase cycle.

Figure 1:
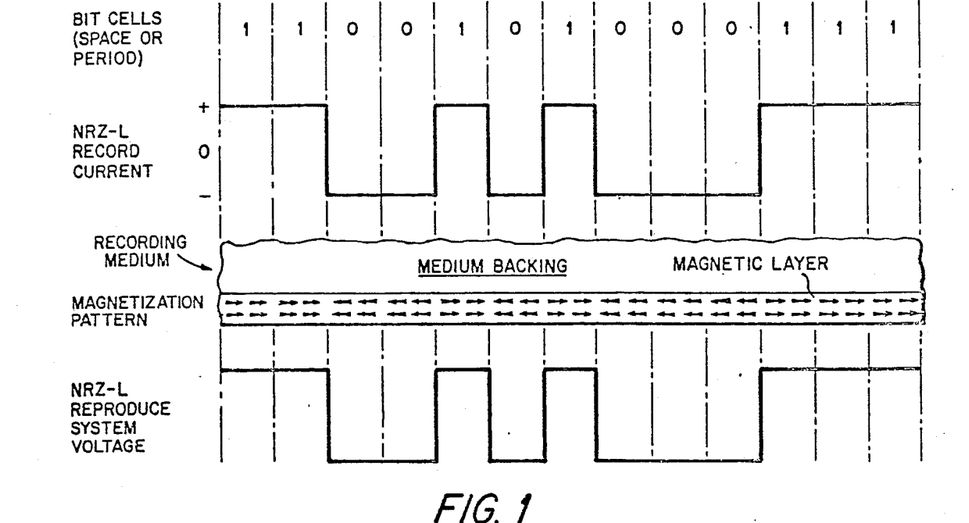
FIG. 1 is a chart illustrating conventional continuous magnetic recording.

FIG. 1 illustrates a record current waveform with the corresponding reproduce system voltage waveform and the corresponding remanent magnetization pattern. The magnetization pattern is represented by a simple planar (parallel to plane of medium) vector model. This illustration is typical of a non-return-to-zero-level (NRZ-L) digital system. The planar vector model disregards any normal (perpendicular) components of magnetization which exist in regions of flux transitions in the medium.

Figure 2:
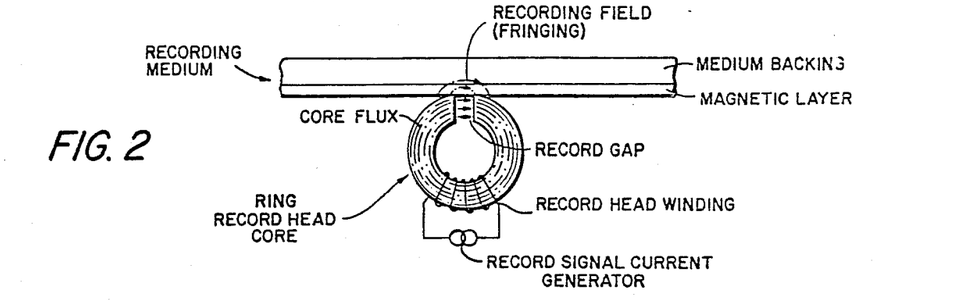
FIG. 2 illustrates a conventional magnetic record head and media.

FIG. 2 illustrates an elementary ring record head which converts record signal current from a head driver (generator) to a fringing magnetic recording field which penetrates into the magnetic layer of a recording medium.

Record head structures of a type widely applied in the current art are usually more complex than that depicted in FIG. 2, but the essential principles are the same; signal current through the core windings produces magnetic flux within the material of the head core, some of which emanates from the region of a non-magnetic gap to form the recording field.

Figure 3:
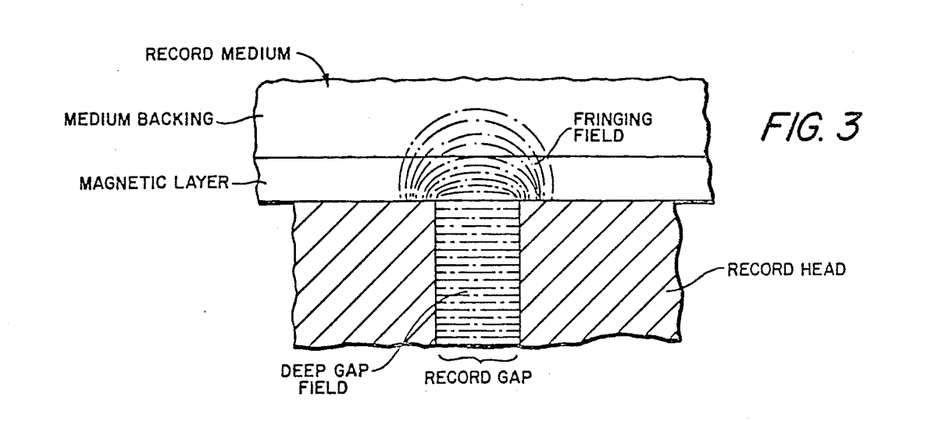
FIG. 3 is an enlarged detail of FIG. 2.

A more detailed illustration of the magnetic field in the region of a record head gap is given in FIG. 3.

As a medium is being recorded the instantaneous magnetization of each of its particles or domains is determined by the magnetic susceptibility of the particle and the intensity and direction of the recording field at the particle site. The susceptibility of a particle may vary with its orientation. The particles of typical commercial recording media are capable of being switched to a new state of magnetization within 3 nanoseconds of a change in the recording field.

Figures 4, 5A, 5B:
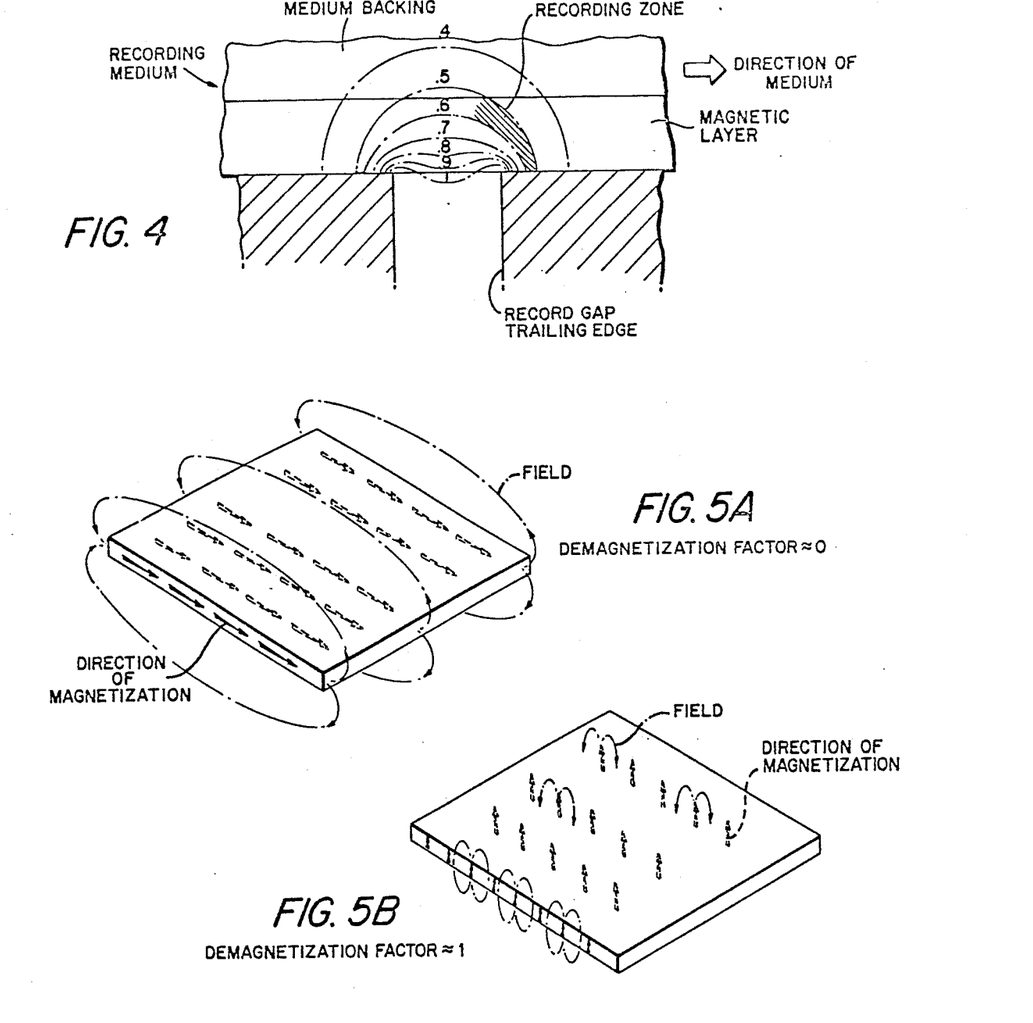
FIG. 4 further illustrates a recording zone.
FIGS. 5A and 5B illustrate the demagnetization effect in a thin, flat recording sheet.

During recording, the magnetization of a particle changes as a function of field direction and intensity attributable to position change or record signal change while the particle moves through the entire recording gap region; but, the final determinant of remanent magnetization is the direction and intensity of the field near the trailing edge of the recording gap. Therefore, the recording zone of a head is generally considered to exist along contours emanating from the trailing edge in which the field intensity approximately equals the coercivity of the medium. FIG. 4 illustrates such a recording zone. The contours shown depict contours of constant magnetic field intensity as opposed to filed lines. The numerals 1, 0.9, 0.8, etc. indicate field strength relative to the strength in the center of the deep gap field. The gap length of a record head is usually designed to produce a desired record zone penetration depth into a medium. Gap length values ranging from one to two times the minimum wavelength to be recorded are typical.

Another factor affecting remanence is demagnetization. Demagnetization occurs when fields emanating from a magnetization return to oppose the sense of adjacent magnetizations. If the geometry of a magnetized region is such that its field generally emanates and returns externally, the demagnetization factor will be low; if its field generally returns internally through the region of the magnetization, the demagnetization factor will be high.

FIG. 5 illustrates the demagnetization effect for a thin, flat sheet whose length and width dimensions are very large with respect to thickness. When most of the field returns externally, as in FIG. 5a, the demagnetization factor is nearly zero and remanence is high; when most of the field returns internally, as in FIG. 5b, the demagnetization factor is nearly unity and remanence is low.

Similarly, for a continuum of recorded planar magnetizations, long compared to their depth (magnetic layer thickness), the demagnetization factor is low. As the recorded wavelength of such planar magnetizations decreases, the demagnetization factor increases, i.e., for purely planar magnetizations, remanence decreases with recorded wavelength.

If a long array of normal magnetizations of like sense is recorded, the situation is similar to that depicted in FIG. 5b, and the demagnetization factor is high. However, if the normal magnetizations alternate in sense over closely spaced intervals, as occurs in short wavelength recording, then their fields are mutually supportive and the demagnetization is low. For purely normal components of magnetization, remanence increases as the recorded wavelength decreases.

Figure 6A:
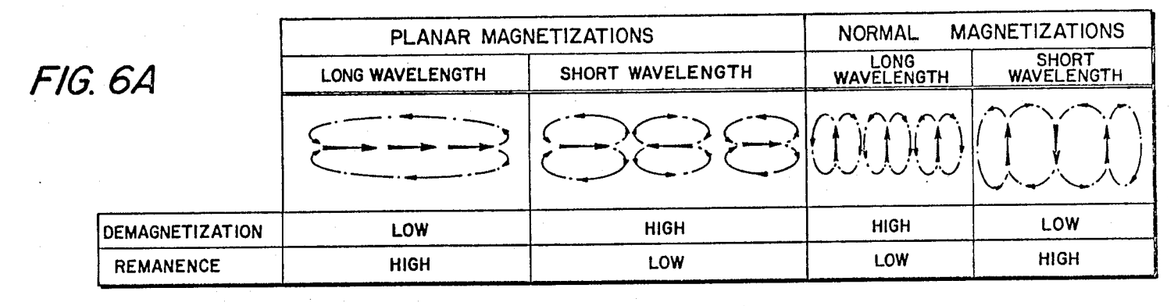
FIG. 6A is a table summarizing demagnetization effects.

Table 1 is presented as FIG. 6A, and it qualitatively summarizes demagnetization effects for long and short wavelength planar and normal magnetizations.

As a region of a medium moves through an active recording zone, the shape of that zone (FIG. 4) produces both planar and normal magnetization components, instant by instant; these components are then subject to modification by demagnetization effects.

Figure 6B:
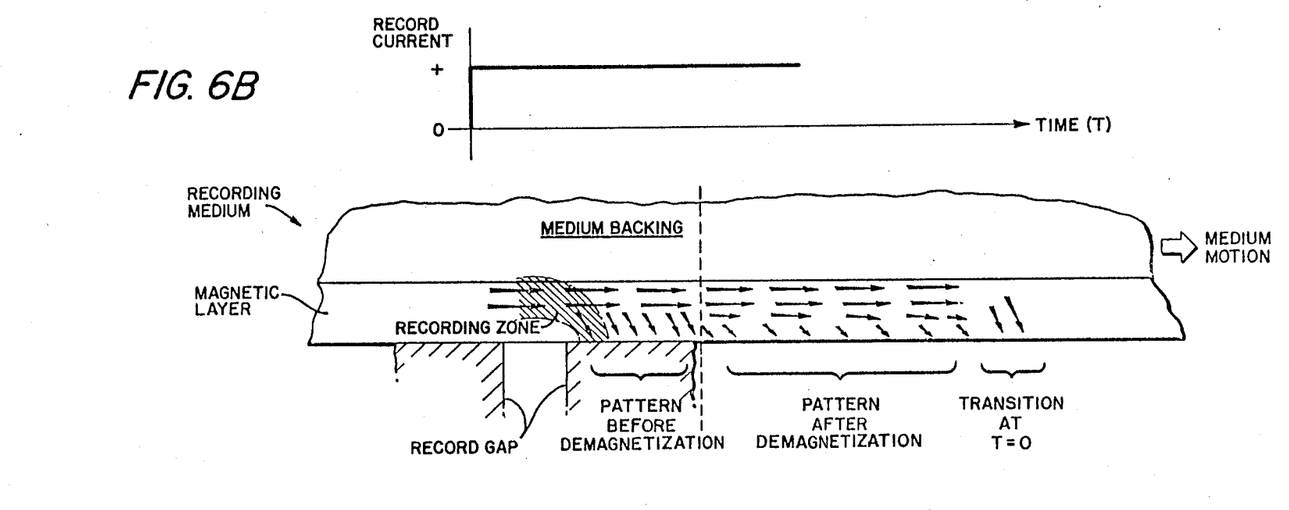
FIG. 6B shows a magnetization model for a record current transition.

FIG. 6B shows a record current transition and a model of the resulting magnetization pattern before and after demagnetization. The long planar component array is essentially unchanged by demagnetization. However, the normal components are diminished by demagnetization with the exception of those located in the region corresponding to the transition. These transition region normal components are less affected by demagnetization because of a supporting field from the planar continuum which they terminate.

Figure 7:
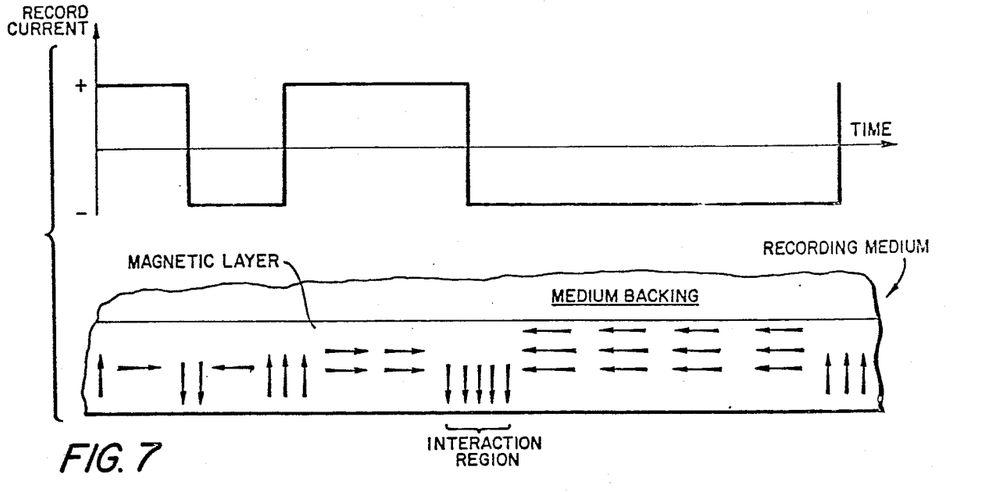
FIG. 7 shows a magnetization model for a particular record current transition.

In general, the longitudinal recording of a digital data signal continuum produces a magnetization pattern of normal components marking transition regions which are supported (flux linked) by planar components. The longer the recorded half-wavelength, i.e., the longer the recording signal remains at one polarity, the longer will be the continuum of planar components, the deeper will be its penetration into the medium, and the longer will be the region of possible interaction between normal components terminating adjacent, opposite sense, half-wavelengths. Such interaction is a cause of pulse crowding which contributes to pattern sensitivity. FIG. 7 illustrates a simplified planar and normal component model associated with a record current waveform having various single polarity time intervals.

Compensating pattern sensitivity by means of advancing or delaying record current transitions is known in the art. Some effects contributing to pattern sensitivity can be minimized by means of thin magnetic medium coatings, record heads having short gap lengths to limit fringing flux penetration and to improve the record field gradient, and by means of reduced record current to limit flux penetration and to improve the field gradient. The latter means, of course, compromises overwrite performance.

Figure 8:
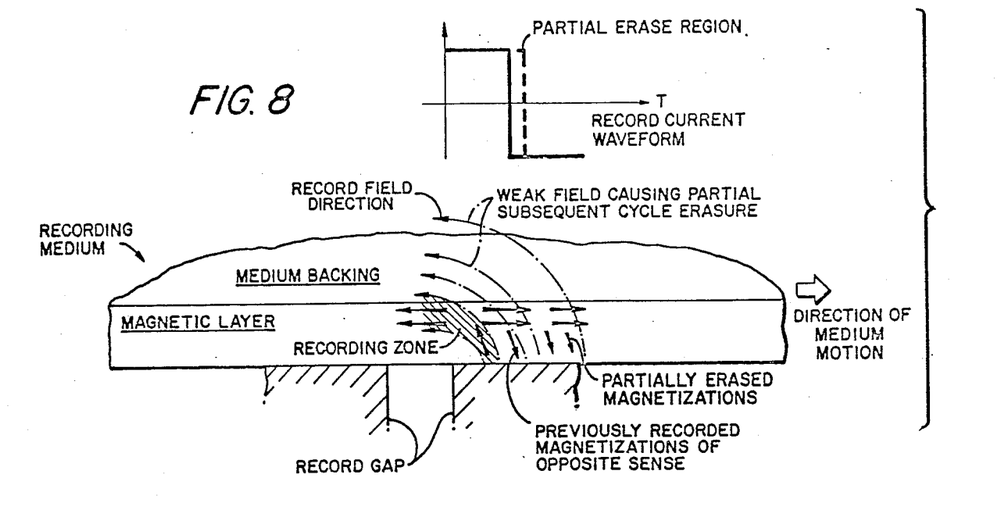
FIG. 8 shows a subsequent cycle partial erasure for a record current rapid change in polarity.

When a recording current changes polarity rapidly, as in the recording of a square wave, a subsequent cycle partial erasure occurs. FIG. 8 illustrates this effect. As the polarity of the record current changes, previously recorded magnetizations leave the record zone to be affected by a weaker field of opposite sense, i.e. partially erased. Thus, output levels are reduced for signals having closely spaced reversals of polarity.

The more abruptly the field strength decreases with distance from the trailing edge of the record gap, i.e. the higher the recording field gradient, the less will be the effects of subsequent cycle erasure. In general, increasing record current, which may be done to assure adequate overwrite levels in a digital system, decreases the recording field gradient and increases the effects of subsequent cycle erasure.

Figure 9:
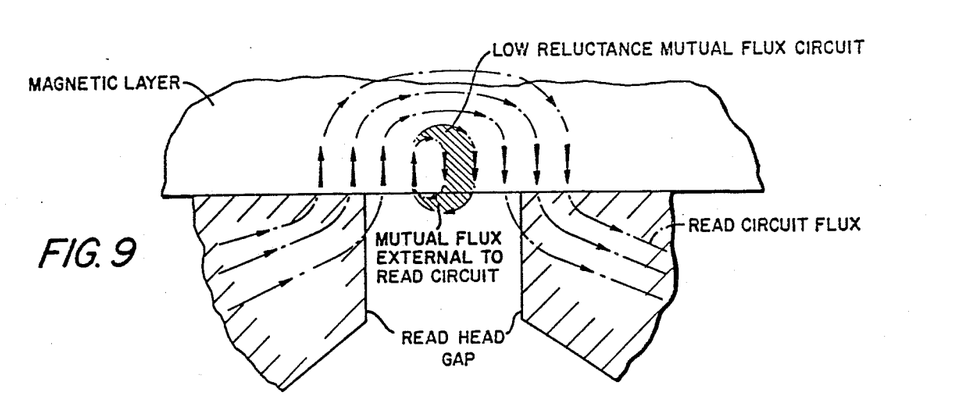
FIG. 9 shows proximity mutual flux loss.

Opposite sense normal magnetizations in close proximity may have a mutual flux circuit of such low reluctance as to preclude their flux contribution being sampled by a reproduce head circuit, as is illustrated in FIG. 9. This proximity mutual flux "loss" can reduce signal output and shift the point at which a transition is sensed in the medium by the reproduce circuit.

Figure 10:
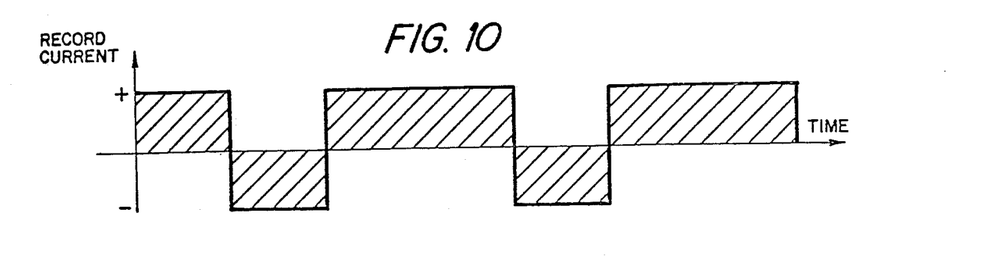
FIG. 10 shows one typical data record current waveform.

FIG. 10 illustrates a typical digital data record current waveform. Current is maintained in one direction or the other through a record head winding. Heat energy dissipated by a head and head driver is a function of the shaded area of the waveform shown. The sustained heating effect of the relatively high currents required in some digital systems precludes use of low power rated and inexpensive components in head driver circuits, particularly for multi-track systems.

The remanent flux produced by sustained currents through the record head can be modulated at any time a medium is being recorded by variation in head to medium contact, thereby producing noise. This noise modulation is caused by random irregularities in surface quality of the medium.

Some digital recording systems utilize a read-after-write protocol and, to accomodate it, very closely spaced write (record) and read (reproduce) head gaps, e.g., 0.150 inch. In such systems, crossfeed, the transformer coupling of write head energy to read circuits, is a major design consideration. Crossfeed can interfere with the data being reproduced from the recording medium. Transformer coupling of write energy generally increases with frequency, however, frequencies higher than the fundamental frequency of the highest data rate are of less concern because the reproduce head circuit can include low pass filter elements to reject them.

Figure 11:
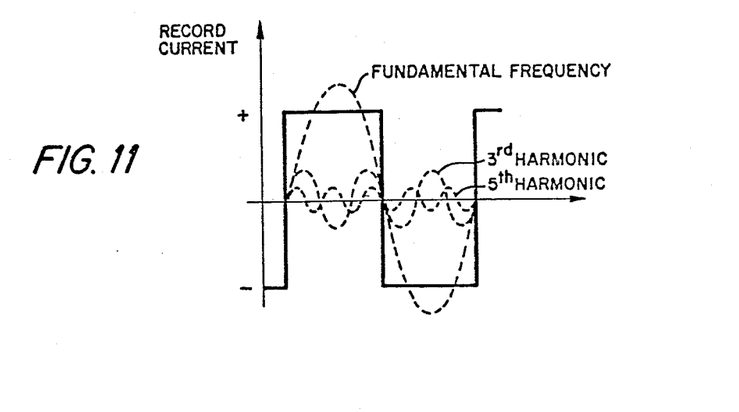
FIG. 11 shows a square wave with its fundamental frequency, and third and fifth harmonics.

FIG. 11 shows a square wave which might represent the highest data rate record current waveform of a digital record/reproduce system. The relative amplitudes of the fundamental frequency, the third harmonic, and the fifth harmonic comprising part of the frequency spectrum of this waveform are also shown. The harmonics can, of course, be filtered by the system; but the fundamental frequency which has a higher peak value than the recording waveform can crossfeed to the reproduce circuit. Design elements of the read/write head assembly and its shielding are dictated by crossfeed performance versus cost considerations.

DESCRIPTION OF THE INVENTION

In accordance with the present invention, a magnetic flux continuum analogous to a digital information signal continuum is recorded as a sequence of end-to-end juxtaposed magnetized increments. The sequence of magnetized increments is recorded along a track of a recording medium as the medium moves at constant speed relative to a record transducer (head). Each magnetized increment comprising the magnetic flux continuum is produced by an instantaneous magnetic recording field. This instantaneous recording field results from the record head being driven by a current impulse. The current impulse is of short duration compared to the time required for a point on the track to traverse the length of the recording field which it produces. The length of each magnetized increment so produced includes the length along the track penetrated by the recording field; for a ring head, this length is the entire gap leading edge to gap trailing edge penetrating field length which includes all contours of sufficient intensity to produce a recording effect. The length of each magnetized increment also includes the relatively small distance traversed by a point on the track during application of the current impulse. The timing of the sequence of current impulses which produce the sequence of magnetic increments is such that the end of one magnetized increment on the medium is made to approximately coincide with the beginning of the next magnetized increment, in sequence, along the track. Of course, the timing is a function of the speed of the record medium relative to the record head.

Thus, a magnetic flux continuum is produced by a sequence of current impulses having a low active duty cycle.

In one embodiment of the present invention, the aforesaid magnetized increment length (determined, in part, by the record head gap length) is made to coincide with the length of an NRZ-L bit cell recorded on magnetic tape. Thus, it can be appreciated that a sequence of bits can be recorded on tape by means of uniformly time-separated, short duration, current impulses of appropriate sense, one current impulse corresponding to one recorded bit; and that the magnetization pattern thus produced will be similar to that produced by systems which apply current of one sense or the other to the record head continuously (continuous current systems); and that the heating effect (average power consumption) of such current impulses in head driver electronic components can be low, and that media surface modulation noise can be statistically limited during recording by the short duration of the active current impulse.

It can also be appreciated that the sequential current impulse waveforms are not characterized by instantaneous reversals of polarity, as are continuous current system waveforms. Therefore, there are minimal subsequent cycle erasure effects and proximity mutual flux loss effects. In consequence, peak record currents can be made relatively high to achieve good overwrite performance without causing a significant loss of output for high transition rate signals and without causing at least one transition shifting mechanism.

An additional factor to be appreciated is that the sequential current impulse waveform spectrum includes a fundamental frequency of lower peak value than the impulse itself, and use of sequential current impulse recording can result in low crossfeed interference by the fundamental frequency component.

Therefore, the objects of the present invention are:

To provide for sequential impulse magnetic recording of information on a magnetic medium in a manner which can be compatible with the reproduce techniques of continuous current recording systems, which systems are widely known and applied in the art.

To provide for magnetically recording information in a manner which requires less energy and dissipates less heat than do continuous recording systems.

To provide for magnetically recording information in a manner less affected by media surface modulation noise.

To provide for magnetically recording information in a manner which can simultaneously achieve less interference from overwritten data, higher output of high transition rate data signals, and fewer transition shifting mechanisms than can simultaneously be achieved by continuous current recording systems.

To provide for magnetically recording digital information in a manner which can produce less fundamental frequency crossfeed interference energy than is produced by continuous current recording systems.

Other objects and advantages of the invention will be apparent to those skilled in the art from the foregoing general description of the invention, and from the following description of one embodiment of the invention. This embodiment is presented only as illustrative of the invention in order to facilitate a complete understanding thereof by those skilled in the art, and to facilitate their making and using the invention. This embodiment represents the best mode contemplated at this time for practicing the invention, although it is obvious that other modes are possible and might indeed ultimately prove more practical.

Figure 12:
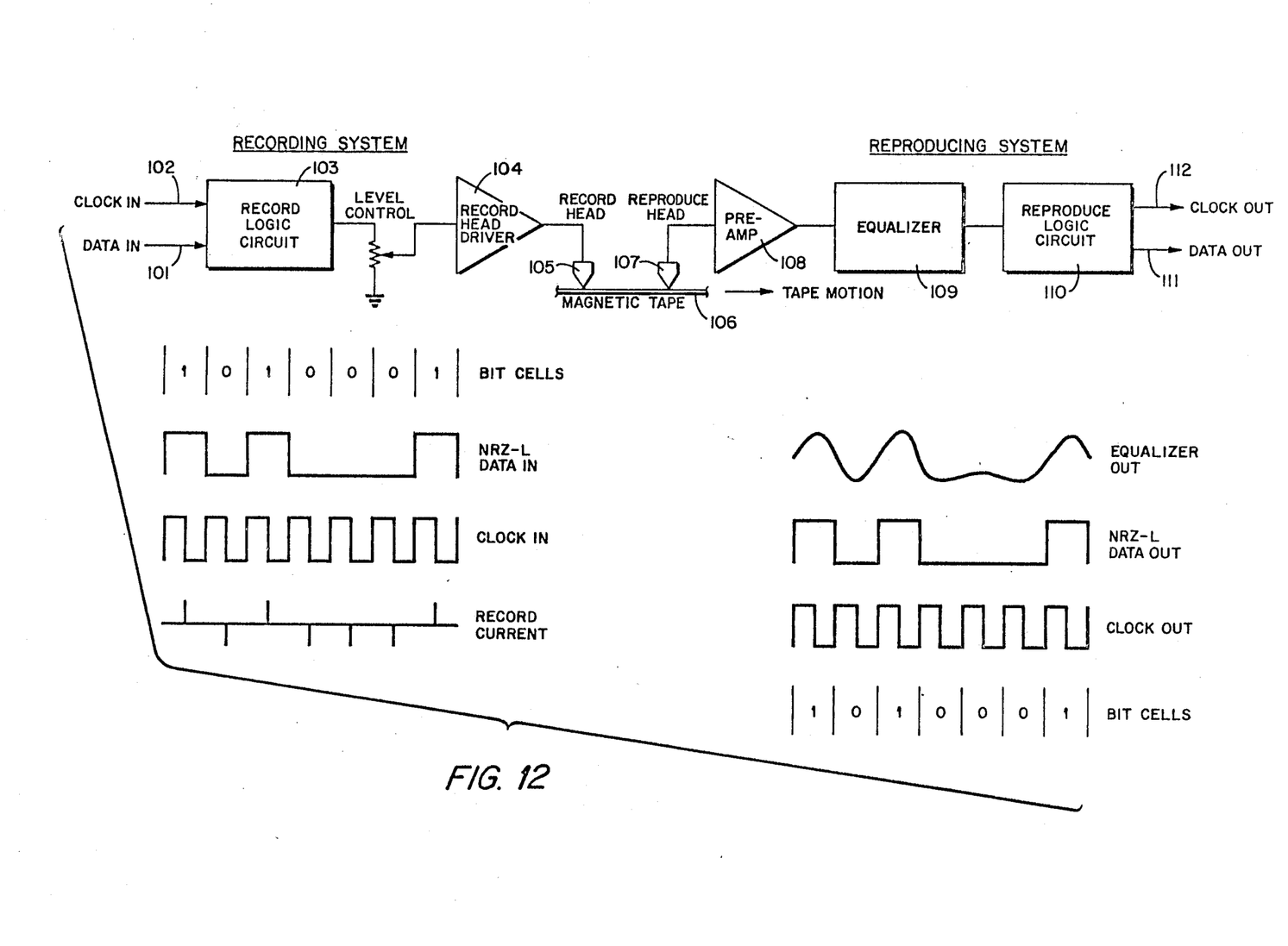
FIG. 12 is a block diagram of a recording system of the present invention.
Figure 13:
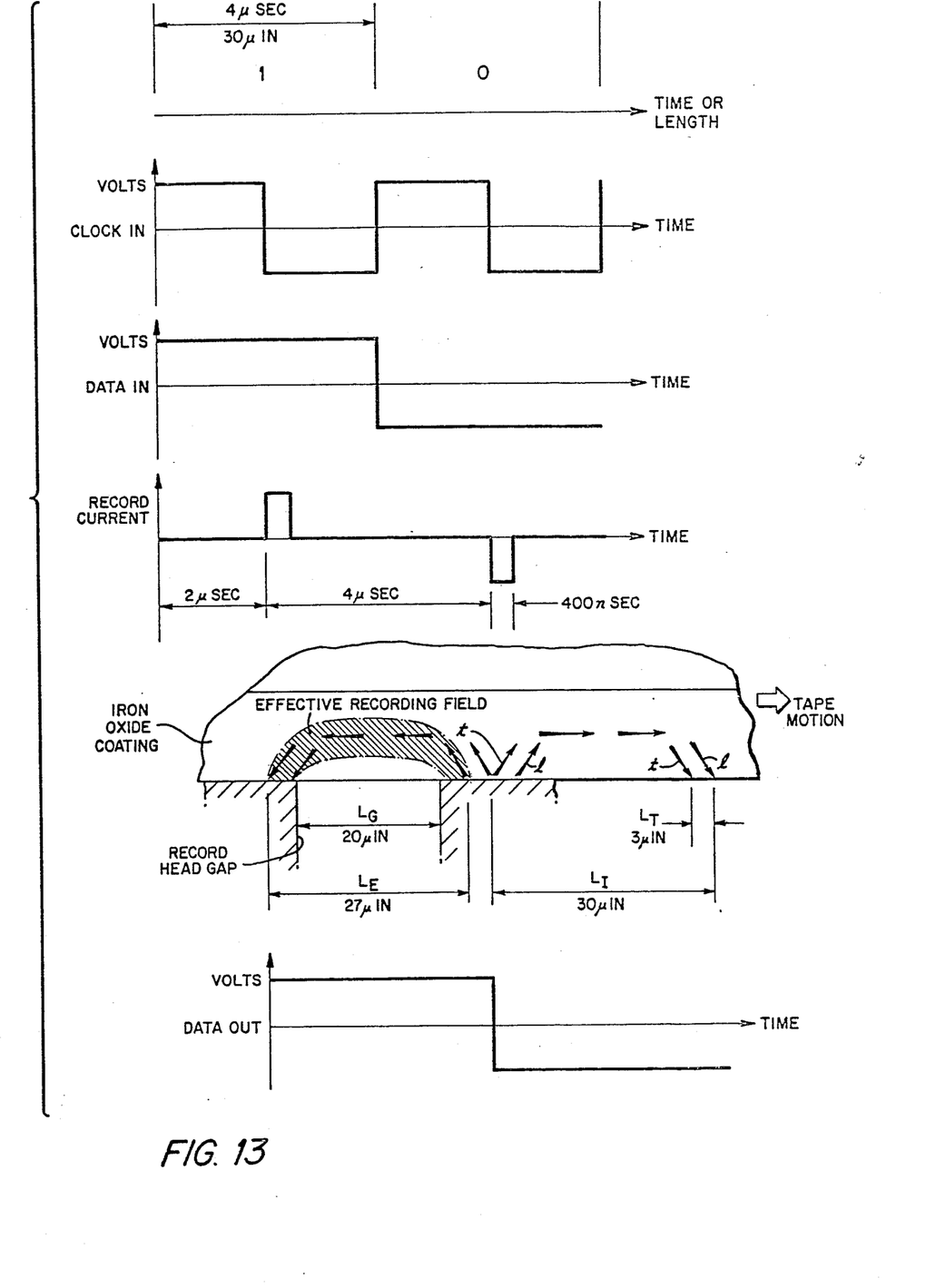
FIGS. 13 and 14 are time, waveforms and magnetic vector charts.
Figure 14:
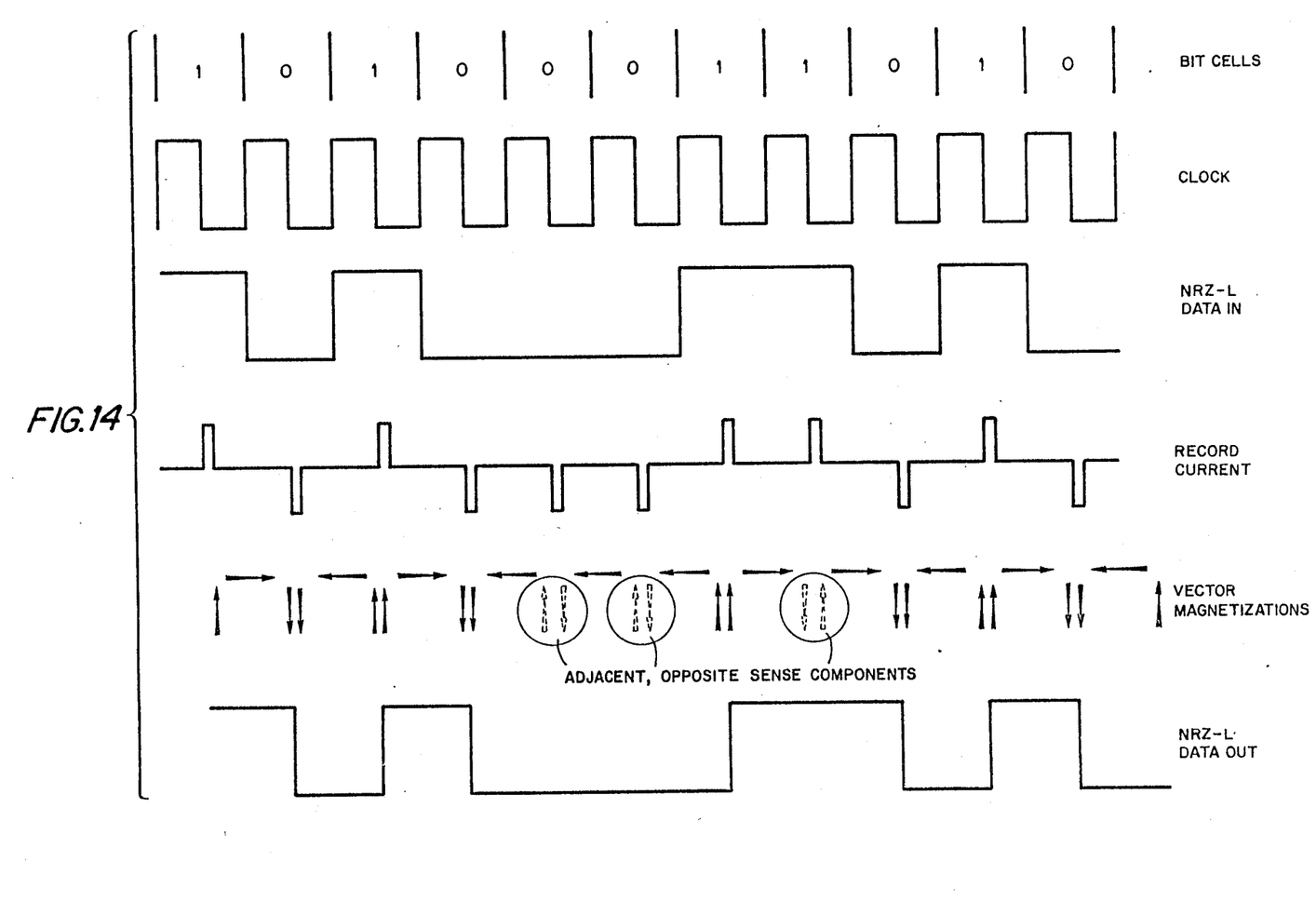
Figure 15:
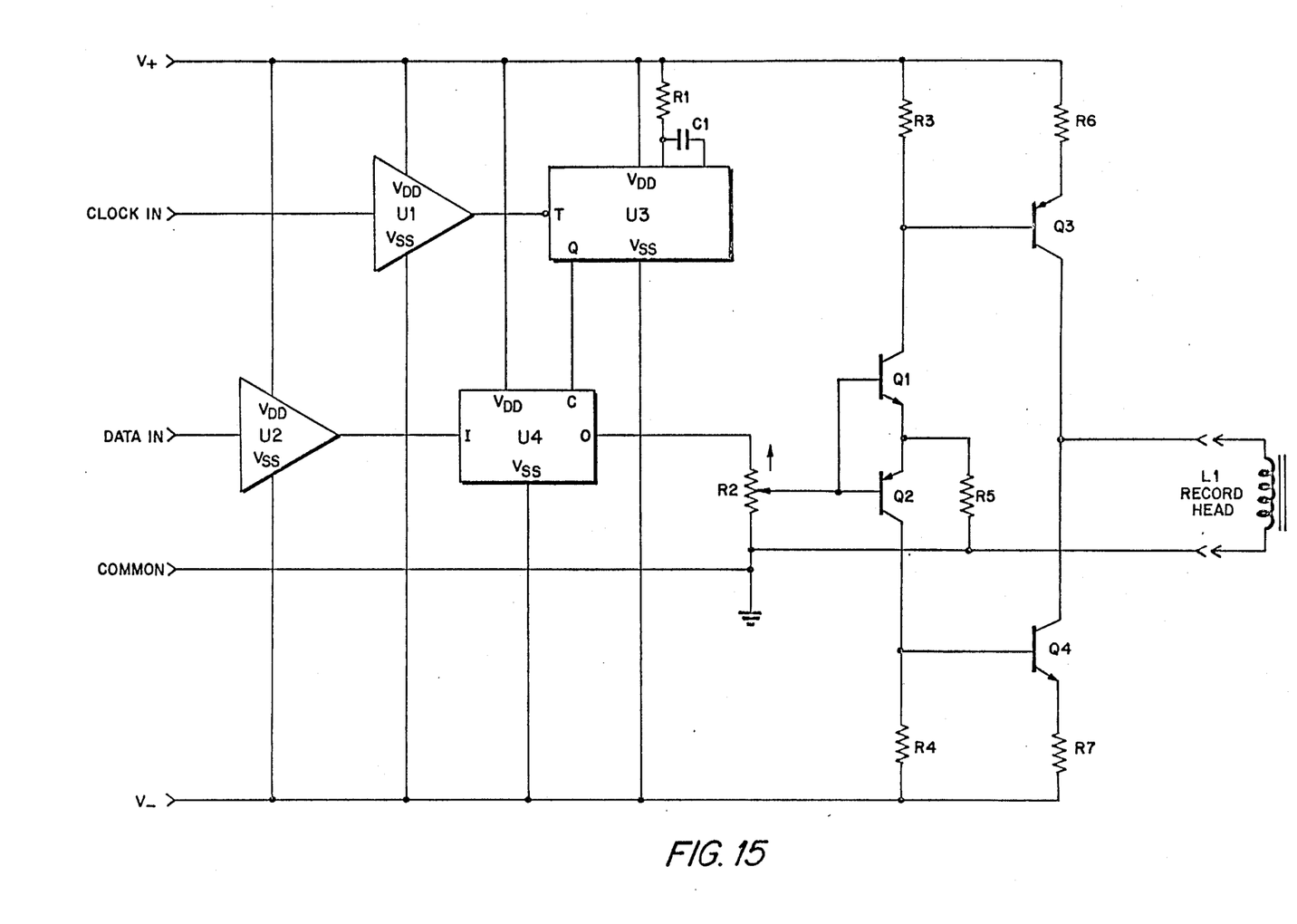
FIG. 15 is a diagram of the record circuit.
Figure 16:
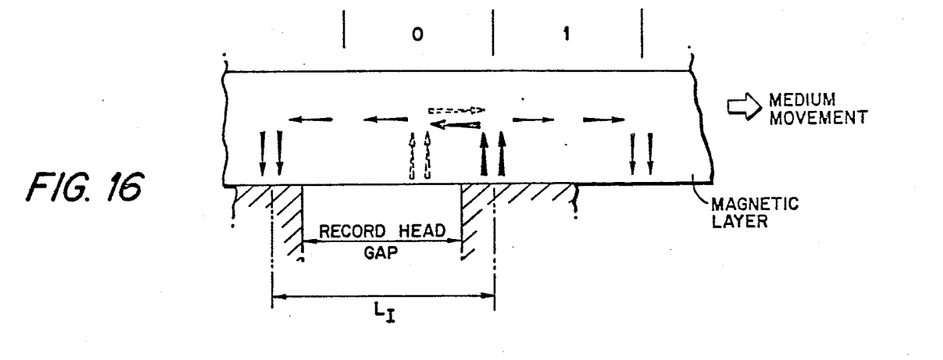
FIGS. 16 and 17 shows magnetic vector components.
Figure 17:
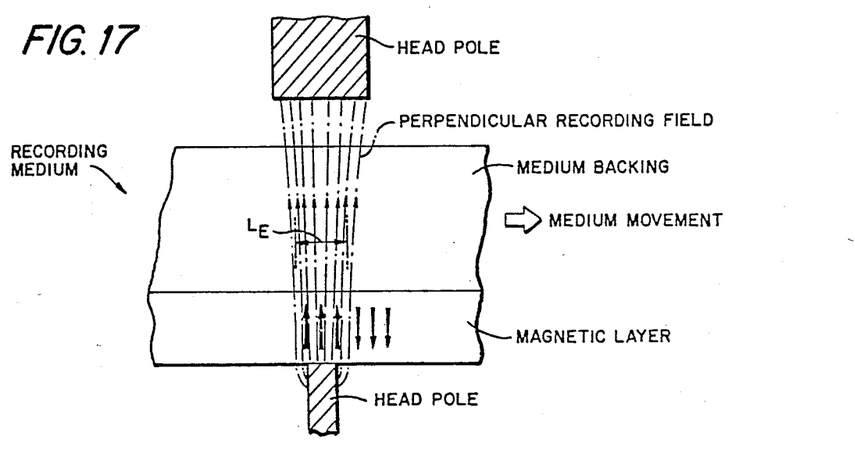

The following description is had in conjunction primarily with FIGS. 12–17 of the accompanying drawings, wherein like reference characters refer to like or corresponding parts, and wherein:

FIG. 12 is a block diagram of a recording system for practicing the present invention, with associated schematic waveform diagrams for explaining the operation;

FIGS. 13 and 14 are time, waveform and magnetic vector charts showing the details of impulse recording in accordance with the present invention;

FIG. 15 is a schematic diagram of the record circuit used in the present embodiment of the invention;

FIG. 16 depicts the magnetic vector components wherein the present invention is practiced with a small overlap in recording increments; and FIG. 17 depicts the magnetic vector components wherein the present invention is practiced with perpendicular field recording.

In one single channel (track) embodiment of the present invention, digital information is recorded on magnetic tape by means of sequential recording current impulses. The magnetization patterns created on magnetic tape by this embodiment are similar to the patterns created by continuous current recording systems in all characteristics essential to their being reproduceable as electrical signals by reproduce systems of types known in the art and widely used in conjunction with continuous current recorders.

FIG. 12 shows a functional block diagram of the present embodiment of the invention, and of a reproduce system. Waveforms associated with the NRZ-L code used, are also shown.

A data signal conveying each bit (level) to be recorded and a clock signal defining each bit period (cell) are applied to their respective record logic circuit inputs 101 and 102. The record logic circuit 103 processes the clock and data to produce dual polarity voltage impulses. The voltage impulses are converted to current impulses of appropriate amplitude and sense by a head driver 104 having an input level control. The head driver, in turn, drives the record head 105. The record head creates an instantaneous magnetic recording field and a magnetically recorded increment in the tape 106, for each intermittent current impulse. The length of each increment thus recorded is related to the record head gap length. The spacing of these recorded increments is defined by the timing of current impulses and the speed of the magnetic tape, which speed is well regulated by means known in the art.

For this embodiment, design parameters such as record head gap length, current impulse timing, and tape speed are chosen to produce closely spaced recorded increments on tape, each of which corresponds to a bit cell. A tape thus produced can then be reproduced by a system functionally equivalent to that shown in FIG. 12 and described herein, in general terms, for benefit of an example.

The reproduce head 107 generates a voltage proportional to the rate of change of flux sensed across its gap as the tape moves over it at a uniform speed. The reproduce head signal is amplified by a preamplifier 108, then equalized at 109 to compensate for the non-constant amplitude versus frequency (data level change rate) transfer characteristic of the rate-responsive reproduce head. Phase equalization to compensate for pattern sensitivity or for phase errors introduced by amplitude equalization may also be employed. The equalized reproduce signal is then processed by the reproduce logic circuit 110 which detects and shapes the output data signal, synthesizes a stable clock signal, and accurately synchronizes the data signal to the clock signal, at output terminals 111 and 112.

A dimensioned timing diagram and vector magnetization model for the recording of a 1-0 bit sequence by the subject emobidment is shown in FIG. 13. The timing of the reproduce waveform for that sequence is also shown.

The data rate of this embodiment is 250,000 bits per second (BPS) recorded (and reproduced) at a tape speed of 7½ inches per second (IPS) to produce a bit packing density on tape of 33,333 bits per inch (BPI). For the NRZ-L code used, 33,333 is also the maximum number of flux changes per inch (FCI), i.e. the maximum number of sense reversed, adjacent increments (half-cycles) recorded per inch of tape. Each bit cell corresponds to a time interval of 4 microseconds and a recorded length of tape of 30 microinches. The upper frequency of the record/reproduce channel pass band need only be 125,000 Hertz for 250,000 BPS at the Nyquist rate of 2 bits per Hertz.

The clock period is 4 microseconds to provide a positive-going voltage transition at the beginning of each bit cell as shown. The 50 percent duty cycle clock waveform also provides a negative-going transition at the center of each bit cell. Each negative-going transition of the clock is used to trigger a recording current impulse. The duration of each current impulse is 400 nanoseconds and its sense is defined by the data level of the cell to which it corresponds.

In the vector magnetization model of FIG. 13, vectors marked "1" represent components recorded at the leading edge of a current impulse; those marked "t" represent components recorded 400 nanoseconds later at the trailing edge of the current impulse. The length, $L_A$, is the distance traveled by the tape during an active current impulse (3 microinches). The shaded area of FIG. 13 represents the effective recording field penetration into the tape, and the length $L_E$, the length of that penetration. The length of each recorded increment, $L_I$, is 30 microinches, the sum of a field penetration length ($L_E$) of 27 microinches plus the 3 microinches traveled during its recording current impulse. The length of the record head gap, $L_G$, producing the desired penetration length is approximately 20 microinches.

FIG. 14 illustrates waveforms and a planar/normal vector magnetization model associated with the subject embodiment and a random bit sequence. The long sequence of identical bits, e.g., 0—0—0, are recorded as identical increments having adjacent terminations of opposite sense components. These components, shown circled in FIG. 14, have energy stable, proximity, mutual fields which cannot be sensed by a reproduce circuit. Therefore, the effective component pattern is similar to one produced by continuous current recording.

FIG. 15 is schematic diagram of the record circuit used for the subject embodiment. Dual polarity, positive logic is used, i.e. a positive voltage signifies a logic "1", a negative voltage signifies a logic "0". U1 and U2 are non-inverting buffers for the clock and data signal respectively. The clock buffer U1 drives the inverting trigger input of a monostable multivibrator, U3. U3 generates a positive pulse at its Q output for each negative-going clock transition. R1 and C1 are timing components which determine the duration of each positive pulse (400 nanoseconds). The Q output of U3 is applied to the control input C of a bilateral switch, U4. The output of U2 is connected to the data input I of U4. When the control input of U4 is negative, it is in a high impedance state and its output at 0 is held to ground potential (0 volts) by R2. When the control input is positive, during the 400 nanosecond pulses, the output of U4 is of the same polarity as the data signal. The dual polarity voltage impulses thus derived are divided by level control potentiometer, R2. The R2 signal is connected to a transconductance head driver consisting of Q1 through Q4 and R3 through R7. The head driver converts voltage impulses to current impulses and presents a high source impedance to the record head, L1. The driver, acting as a current source, provides a small L/R time constant in conjunction with record head inductance and results in a broad range of inductances possible in a record head designed to be driven by short duration current impulses. When the input to the bases of Q1 and Q2 is grounded (the quiescent state), Q1 through Q4 are not conducting and no current is supplied to the head. When the input is positive, Q2 and Q4 are not conducting, but Q1 does conduct. The current of Q1 is determined by the value of R5 and the input voltage. Q1 current causes a voltage drop across Q1 collector resistor, R3. The R3 voltage and the value of R6 determine the collector current of Q3. The collector of Q3 drives the record head during positive sense impulses. When the input to the bases of Q1 and Q2 is negative, Q1 and Q3 are not conducting, while Q2 conducts current in an amount determined by the input voltage and the value of R5. Q2 current then causes a voltage drop across R4 which, in conjunction with the value of R7, determines the collector current of Q4. The collector of Q4 drives the record head during negative sense impulses.

Thus, the data signal and clock signal are processed to provide 400 nanosecond current impulses of dual sense for recording.

In summary, the subject embodiment records bits as 30 microinch magnetized increments on tape: the length of each increment is largely determined by head design, not tape motion; and the field energy of each increment is derived from a current impulse having a tape motion related, half-wavelength of only 3 microinches, one tenth of the recorded increment length. Expressed in terms of frequency, the 400 nanosecond recording current impulse relates to the half-wave period of 1.25 megaHertz signal, a frequency ten times higher than the pass band required for the subject embodiment data channel. It is significant that, in comparison to the heat dissipated by elements (e.g. transistor junctions) of comparable continuous current head drivers, the heat dissipated by the impulse current head driver of this embodiment is reduced by 90 percent. A further 90 percent reduction in heat could easily be achieved by reducing the 400 nanosecond current impulses (10 percent duty cycle) to 40 nanoseconds (1 percent duty cycle), an entirely practical value considering that less than 3 nanoseconds is required to switch the particles of the magnetic tape and that any active record current duty cycle including current impulses of at least 3 nanoseconds will, in theory, be sufficient. As a practical matter, the minimum active record current duty cycle acceptable for a given application will be determined by the minimum pulse width handling capacity of components selected for other considerations such as cost. At the other extreme, determining the maximum duty cycle acceptable for a given application requires a more complex analysis of the effects of increased duty on the various benefits expected. In practice, it has been found that substantial benefits of sequential current impulse recording over continuous current recording are obtained by using an active record current duty cycle of 50 percent or less. The vector magnetization resulting from the subject embodiment is effectively the same as that from its continuous current counterpart; but, the magnetizations are produced without the need to continuously record and thereby overwrite record head leading edge components; in fact, it is inefficient to do so.

In the magnetic tape recorder embodiment described herein, the shortest recorded half-wavelength was determined by the data rate and the tape speed, both of which were constant. However, in typical magnetic disk applications, data rate and angular velocity are constant; track (cylinder) speed varies with circumference as does bit packing density and recorded half-wavelength. If, in a disk embodiment of the present invention, design parameters are chosen to yield a recording increment length corresponding to the minimum half-wavelength to be recorded on the outer track, then these recording increments will overlap on inner tracks. Impulse recording with overlapped increments is modeled in FIG. 16. The bold vectors are shown to have overwritten the "over-length" components (shown dashed) of the previously recorded half-wavelength. This increment overlap is similar to overwriting which occurs in continuous current recording systems, except that some benefits of the current impulse recording technique are retained, which benefits are generally associated with the nature of the recording waveform.

The benefit of compatibility with reproduce systems of continuous current recorders is obviously retained regardless of the degree of overlap (or increase in active record current duty cycle caused by overlap) for continuous current recording could be regarded as an infinite sequence of overlaps. The benefits of reduced modulation noise and reduced heat dissipation are inversely related to the active duty cycle of the sequential current impulse recording waveform. The benefits of improved overwrite performance without loss of output for high transition rate signals depends on maintaining a recording medium motion related distance separating the occurrence of opposite sense record current impulses, which distance is at least equal to the length of the record zone located at the trailing edge of the record head gap (refer to FIG. 8.) Of course, the record zone length increases with peak record current but the condition of separation of opposite sense recording impulses is generally met so long as the combination of the impulse duration and the overlap provides an inactive time interval between impulses which allows this distance to traverse the head. The benefit of reduced crossfeed interference depends on the degree of reduction of the fundamental frequency energy for the impulse current waveform compared to that of a continuous recording current waveform. In summary, the overall benefits of sequential current impulse recording are retained substantially for moderately overlapped increments. This fact permits application of reasonable gap length tolerances in the manufacture of current impulse record heads for all applications. Operation with overlapped recording increments also permits use of the current impulse recording method with codes having possible transitions at sites other than those defined by integer multiples of the minimum half-wavelength increment.

In an embodiment of the present invention which utilizes perpendicular field recording, the length of the effective field region ($L_E$) is defined by head pole geometry rather than record head gap length. Purely normal magnetization components of one sense are recorded in each increment length as shown in FIG. 17. Each recorded increment is produced by a single, low duty cycle, current impulse of appropriate sense in a manner similar to that described herein for the longitudinal recording embodiment.

Restating the invention in light of all the foregoing description and analysis, in reference to the embodiment utilizing the linear traverse of a magnetic record head relative to the surface of a magnetic record medium, the following terms are defined:

$L_E$ is the length along said line of traverse of the effective recording field of the record head (see FIG. 13);

$L_A$ is the length of said linear traverse during the time of application of an active record current impulse to said record head (see FIG. 13);

$L_I$ is the length of a recorded increment resulting from the application of a record current impulse to said record head (see FIG. 13);

$S_T$ is the speed of said traverse;

$T_A$ is the period of an active recording current impulse (see FIG. 13); and $T_R$ is the period between initiation of successive recording current impulses (see FIG. 13).

In accordance with the present invention the relationships among the terms defined above are expressed by the following equations:

1. $L_A = S_T \times T_A$;
2. $L_I = L_E + L_A$; and
3. $L_A < L_E$

In the referenced embodiment of the invention, $T_A/T_R$ is the active record current duty cycle, it may conveniently equal about ¼, or 1/10, or can be made as small as is practical for the minimum pulse width capacity of the components selected for the recording circuit. Of course, the recording current impulse must be of sufficient duration to accomplish switching of the magnetic particles. Also, ideally, $L_E = S_T (T_R - T_A)$ and $T_R = L_I/S_T$ as this would mean that the effective length of the recording field ($L_E$, determined by record head design and magnitude of record current) exactly corresponded to the length of traverse of the magnetic medium during the inactive time interval between successive, active recording current impulses; in consequence, a continuous magnetic recording without overlap or separation of successive increments of recording would be provided. However, the advantages of the present invention are still obtained with some measure of overlap or separation of the successive increments of recording.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of magnetic recording by means of a magnetic recording head having a recording gap and a magnetic recording medium having a recording surface, wherein a relative traverse is effected between said head and said medium across said gap, said head providing a determined length of effective recording field along the line of said traverse, comprising applying to said recording head a sequence of electrical impulses of short time duration and at spaced time intervals for effecting magnetic recording thereof in said medium as recorded increments, the time duration of each of said impulses being a small fraction of the time period for said traverse across said gap, and the length of each of said time intervals between impulses being approximately equal to the time period of traverse over said length of effective recording field.

2. A method as set forth in claim 1, wherein the lengths of said time intervals, second-mentioned time period and time duration are selected to produce a moderate overlap of successive recorded increments.

3. A method as set forth in claim 2, wherein the lengths of said time intervals, second-mentioned time period and time duration are selected to produce about a one-third overlap of successive recorded increments.

4. A method as set forth in claim 1, wherein the lengths of said time intervals, second-mentioned time period and time duration are selected to produce substantially no overlap of successive recorded increments.

5. A method of magnetic recording an electrical signal embodying a waveform by means of a magnetic recording head having a recording gap and a magnetic recording medium having a recording surface, wherein a relative traverse is effected between said head and said medium across said gap, said head providing a determined length of effective recording field along the line of said traverse, comprising applying to said recording head a sequence of electrical impulses of short duration at spaced time intervals for effecting magnetic recording thereof in said medium as a succession of recorded increments representative of segments of said waveform, the time duration of each of said impulses being a small fraction of the time period for said traverse across said gap, and the length of each of said time intervals between impulses being approximately equal to the time period of traverse over said length of effective recording field, whereby said succession of recorded increments constitutes substantially a recorded continuum representative of said waveform.

6. A method as set forth in claim 5, wherein the lengths of said time intervals, second-mentioned time period and time duration are selected to produce a moderate overlap of successive recorded increments.

7. A method as set forth in claim 6, wherein the lengths of said time intervals, second-mentioned time period and time duration are selected to produce about a one-third overlap of successive recorded increments.

8. A method as set forth in claim 5, and further including transducing said recorded continuum to an electrical signal substantially corresponding to said waveform.

9. A method as set forth in claim 5, wherein the lengths of said time intervals, second-mentioned time period and time duration are selected to produce substantially no overlap of successive recorded increments.

10. In a system for magnetic recording of an electrical signal embodying a waveform, including a magnetic recording head having a recording gap, a magnetic recording medium having a recording surface, and means for effecting relative traverse between said head and said medium across said gap, said head providing a determined length of effective recording field along the line of said traverse, the improvement comprising means for generating and applying to said recording head a sequence of electrical impulses of short duration at spaced time intervals for effecting magnetic recording thereof in said medium as a succession of recorded increments representative of segments of said waveform, the time duration of each of said impulses being a small fraction of the time period for said traverse across said gap, and the length of each of said time intervals between impulses being approximately equal to the time period of traverse over said length of effective recording field, whereby said succession of recorded increments constitutes substantially a recorded continuum representative of said waveform.

11. In a system as set forth in claim 10, means for transducing said recorded continuum to an electrical signal substantially corresponding to said waveform.

12. In a system as set forth in claim 11, the lengths of said time intervals, second-mentioned time period and time duration being selected to produce a moderate overlap of successive recorded increments.

13. In a system as set forth in claim 12, the lengths of said time intervals, second-mentioned time period and time duration being selected to produce about a one-third overlap of successive recorded increments.

14. In a system as set forth in claim 11, the lengths of said time intervals, second-mentioned time period and time duration being selected to produce substantially no overlap of successive recorded increments.

15. In a system as set forth in claim 10, the lengths of said time intervals, second-mentioned time period and time duration being selected to produce a moderate overlap of successive recorded increments.

16. In a system as set forth in claim 15, the lengths of said time intervals, second-mentioned time period and time duration being selected to produce about a one-third overlap of successive recorded increments.

17. In a system as set forth in claim 10, the lengths of said time intervals, second-mentioned time period and time duration being selected to produce substantially no overlap of successive recorded increments.

* * * * *